R. A. Adams,

Graining Machine,

N° 51,774.    Patented Dec. 26, 1865.

Witnesses:
Geo. Payson
Chas. A. Gregory

Inventor:
Robert A. Adams

UNITED STATES PATENT OFFICE.

ROBT. A. ADAMS, OF CHICAGO, ILLINOIS, ASSIGNOR TO HIMSELF AND EDWIN LEE BROWN, OF SAME PLACE.

APPARATUS FOR GRAINING WOOD.

Specification forming part of Letters Patent No. 51,774, dated December 26, 1865; antedated December 13, 1865.

*To all whom it may concern:*

Be it known that I, ROBERT A. ADAMS, of Chicago, county of Cook, and State of Illinois, have invented certain new and useful Improvements in Machines for Graining in Imitation of Wood and Marble; and I do hereby declare that the following is a full, clear, and exact description thereof, reference being had to the accompanying drawings, making a part of this specification, the same letters indicating the same parts in the different drawings.

Figure 1:
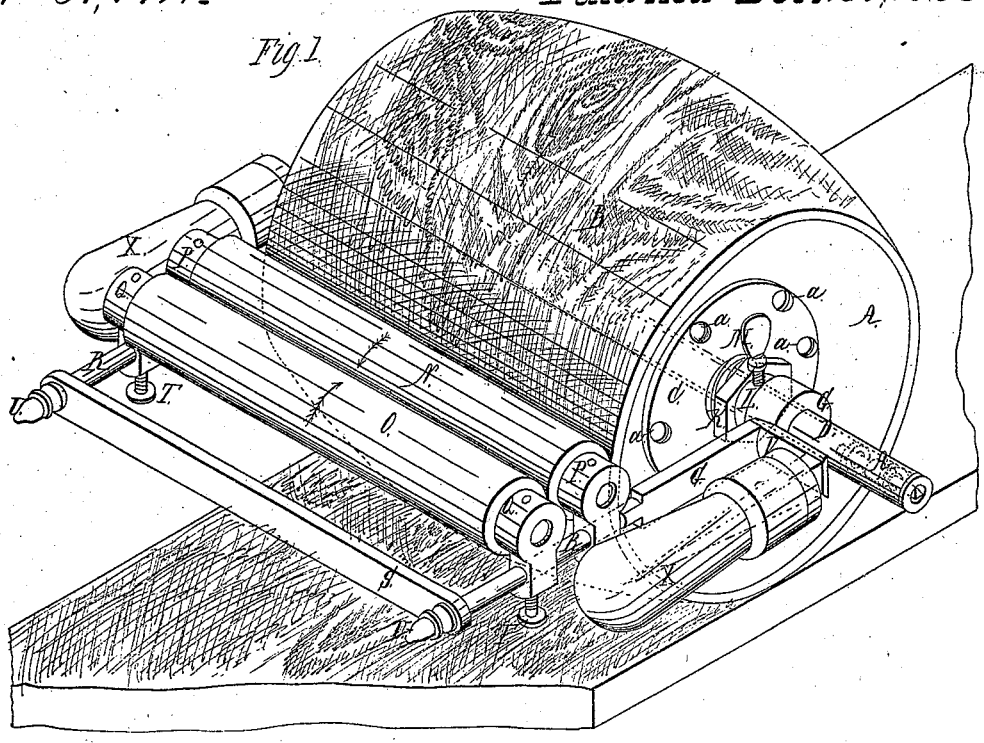
Figure 2:
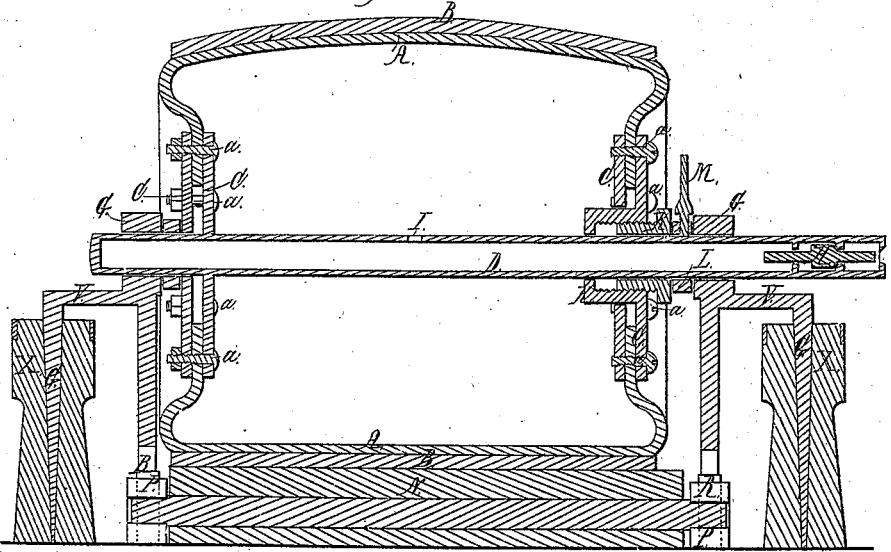

Figure 1 is a perspective view of the machine containing said improvements. Fig. 2 is a horizontal sectional view of the same, designed to show the interior of the cylinder A.

To enable others skilled in the art to make and use my invention, I will proceed to describe its construction and operation.

A is a hollow air-tight drum or cylinder, shaped like a barrel, or straight, or concave, or of any other shape suitable to the work to be done. For general use it should be convex or barrel-shaped, as shown in the drawings. In this shape it can be accommodated to a great variety of surfaces by means of its elasticity and compressibility, and by letting out more or less of the air, as hereinafter shown. It may be made of different sizes, according to the work to be performed. It is formed by attaching to each end of a bag, or hollow ball of rubber or rubber-cloth, or any other suitable material, two circular metallic disks or plates—one on the outside and one of the same size on the inside—as shown at C C. Each of the two outside plates is firmly attached to its corresponding inside plate by the screws *a a*, thus holding a portion of the rubber bag closely pressed between them. Through the center of these circular plates there projects, on each side, the metallic axle D, running through the whole machine, on which the cylinder A is intended to revolve. This axle is fitted at each end into the handles G G, so as to turn smoothly and with little friction. This axle D is made hollow and closed at one end, with a movable air-tight valve at the opposite end, as shown at H, and interior opening at I, by means of which the cylinder A may be inflated with the breath of the operator. When it is necessary to expel the air it may be done by simply pushing in the valve H and pressing on the sides of the cylinder A.

K is a stuffing-box of the ordinary construction, intended to prevent any leakage of air where the circular plates C C slide on the axle D, as hereinafter shown. On the opposite end no stuffing-box is required, the circular plates C C being there soldered fast to the axle.

L is a washer, and M a set-screw, which follow the stuffing-box and keep it fixed at any desired point upon the axle.

N and O are elastic composition or rubber rollers, intended to distribute the coloring-matter upon the graining-plate B. The color is put upon the first roller, O, is taken from O by N, and thence transferred to the graining plate or belt B. These two rollers N and O turn in sockets P Q, which slide on the rods R R, and may be fixed at any point by the set-screws T T.

The rods R R are connected at their outer ends by the bar S. This bar is secured by the screws U U, and may be taken off at pleasure. The rod R, with its connecting part V, together with the metallic parts of the handle X, are all composed of a single piece. Around the cylinder A is placed an endless elastic graining belt or band, B, made of rubber or elastic composition, and constructed in the following manner: I first take a cylinder, of wood or soft metal, of the same size and form as I wish to have the graining plate or belt B, but made in sections, so as to be easily taken apart by first withdrawing the interior sections. On the curved surface of this cylinder I carve the grain of the wood I wish to imitate. I then inclose this wooden cylinder within a larger hollow cylinder, of wood or metal, and fill the space between them with liquid plaster or any other material suitable for making the mold. When the plaster is set I remove the inner cylinder by taking out first the inner pieces or sections, so as not to injure or disturb the plaster cast. Inside this cast thus obtained I put the rubber air ball or bag and inflate it with air, leaving sufficient space between the two to give the proper thickness of about the eighth of an inch for the elastic plate. I fill this space with the composition or rubber poured in in a liquid state. When this has cooled I draw out the air from the inside of the air-ball, thus collapsing it, and then easily withdraw the air-ball, together with the endless elastic plate, from the plaster cast. The surface of the air-ball should be first oiled before putting it into the plaster mould, so that the elastic plate may not adhere to it, but may be removed at pleasure, as hereinafter shown.

Instead of using the air-ball in the way just described for making the elastic plate, a plain wooden cylinder, convex or barrel shaped, or of such other form as may be desired, and made in sections so as to be removable from the inside, may be employed for this purpose. A space is left between this cylinder and the mold and filled with the composition in the same way just described. After the composition has cooled the cylinder may be withdrawn by first taking out the inside sections, and then the graining-belt may readily be taken from the mold. This graining-belt can be taken off from the air-tight drum or cylinder and put on again at pleasure, or another belt be substituted in its place, by first taking off the color-rollers N and O, the cross-bar S, and one of the handles. These parts are then replaced, the cylinder is inflated by blowing through the tube formed by the axle D, and the machine is ready for use. This requires but little explanation. The operator grasps one of the handles in each hand, and thus rolls the cylinder A B forward from one end to the other of the board or other article to be grained. If he wishes to grain surfaces of different widths, the cylinder A B may be readily made shorter in the direction of its axis by means of the sliding stuffing-boxes and set-screws on the axle. The endless plate will readily accommodate itself to this change by continually rolling in at the edges as the two ends of the cylinder are brought nearer together.

The advantages of this machine are manifest. By its use more graining can be done and in a better manner than by any other graining-machine now known. By its elasticity and compressibility, arising from the elastic and yielding nature of the air within, the hollow cylinder A, carrying the endless graining-plate, adapts itself readily to every inequality of surface. Owing to the same elasticity and compressibility, and the readiness with which the air yields to every pressure, there is no danger of smutching or blurring the impression, as is often the case with graining-machines depending solely on the elasticity or thicknesss of the graining-plate itself. The graining plate or belt being endless and without seam, any length of surface can be grained at one operation in a single piece, without any break or joint, thereby saving the great trouble and difficulty of matching the joints, as has to be done in the ordinary mode. By moving in or out the circular disks C C the machine may be adapted to a great variety of widths. By using different elastic graining-plates all kinds of wood may be imitated by the same machine.

In the machine first made by me the cylinder A B was about eight inches in length and eight inches in diameter in the middle, both length and diameter varying somewhat, according as the circular disks C C are moved in or out. The diameter of the cylinder at the ends may be about one and one-fourth inch less than in the middle when made of the size just mentioned. Larger or smaller machines may be made in the same way, both to be worked by hand or power. If worked by power, some slight changes, not involving, however, any change of principle, would of course have to be made.

Having thus described the construction and operation of the machine, I do not claim the endless elastic plate or belt, nor do I claim a cylindrical graining-machine generally; but

What I claim as my invention, and desire to secure by Letters Patent, is—

1. The hollow elastic air bag or drum to be used in a graining-machine in the manner and for the purpose substantially as above described.

2. The combination of the said endless graining-belt and elastic air-bag, used and operating for the purpose and in the manner substantially as above described.

3. The device, substantially as described, for inflating and collapsing the hollow bag or drum by means of the hollow axle and valve.

4. The device, substantially as described, for regulating the width of the hollow bag or drum by means of the packing-box, axle, and set-screw.

In witness whereof I have hereunto set my hand and seal this 12th day of May, A. D. 1865.

ROBT. A. ADAMS. [L. S.]

In presence of—
WM. J. HAMILTON,
GEORGE PAYSON.